United States Patent [19]

Tanaka et al.

[11] 4,454,421
[45] Jun. 12, 1984

[54] APPARATUS FOR MEASURING RADIATION DOSE

[75] Inventors: Ryuichi Tanaka; Hiromi Sunaga; Naoyuki Tamura, all of Gunma; Toshio Murakami, Tokyo, all of Japan

[73] Assignee: Japan Atomic Energy Research Institute, Tokyo, Japan

[21] Appl. No.: 303,708

[22] Filed: Sep. 18, 1981

[30] Foreign Application Priority Data

Sep. 24, 1980 [JP] Japan .................. 55-132671

[51] Int. Cl.$^3$ .................. G01J 1/00; G01N 5/00
[52] U.S. Cl. .................. 250/336.1; 250/474.1
[58] Field of Search ............ 250/336.1, 472.1, 473.1, 250/475.2, 482.1, 474.1; 356/313, 317, 318, 443; 313/209, 210, 346 R

[56] References Cited

U.S. PATENT DOCUMENTS 3,361,925  1/1968  Vollmer ................. 313/209
3,942,898  3/1976  Anderson ............... 356/443

FOREIGN PATENT DOCUMENTS 449398  5/1975  U.S.S.R. ................ 313/613

Primary Examiner—Janice A. Howell
Attorney, Agent, or Firm—Browdy and Neimark

[57] ABSTRACT

An apparatus for measuring radiation dose using the change in light absorbance of a transparent material upon irradiation which comprises substantially a light source, a monochromatic light emitting unit, a unit for controlling the light amount, a sample mounting unit, a detection unit and an indication unit wherein said light source is a hollow cathode lamp is herein disclosed.

1 Claim, 3 Drawing Figures

APPARATUS FOR MEASURING RADIATION DOSE

BACKGROUND OF THE INVENTION

This invention relates to an apparatus for measuring radiation dose.

The effects of irradiation of ionizing radiations such as electron beams and gamma rays are widely used in industry. For example, they are used in the development of polymers, and the technique of irradiating foods with such ionizing radiations for the purpose of, say, preventing the germination of potatoes is used on an commercial scale. Active effors are being made in other fields such as air and water pollution controls, as well as the production of semiconductors having improved characteristics. In the treatment with ionizing radiations, it is necessary to know the absorbed dose, i.e. the amount of the radiation energy absorbed per unit mass in the material irradiated. There are many methods to determine the absorbed dose, and the method of using the change in light absorbance upon irradiation is widely used partly because it is simpler to use than the others. Among dosimeters used in this method are a cellulosetriacetate (CTA) film dosimeter, polyethylene terphthalate (PET) film dosimeter, polymethylmethacrylate (PMMA) dosimeter, polycarbonate dosimeter, cobalt glass dosimetry, blue Cellophane dosimeter, and a radiochromic dosimetry materials.

FIG. 1 shows the absorption spectrum of an unirradiated sample and an electron beam irradiated sample (5.5 Mrad) as obtained by a CTA dosimeter at wavelength of 270 to 340 nm. Apparently, there occurs a change in light absorbance in the stated range of wavelengths, and readings of light absorbance are usually taken at 280 nm. The relation between the change in light absorbance at 280 nm and the absorbed dose is shown in FIG. 2 from which one can see that the change in light absorbance is linear to an absorbed dose of up to 15 Mrad. Therefore, change in light absorbance can be easily converted to absorbed dose using a calibration factor.

The light absorbance is usually measured with a spectrophotometer for ultraviolet and visible ranges that uses diffraction grating and/or a prism to perform the spectrophotometry of a light from a hydrogen discharge tube and a tungsten lamp. The spectrophotometer is capable of determining the absorption spectrum but it has the following disadvantages: (1) it is not portable and is not handy to use; (2) it is subject to false wavelength setting (for a CTA dosimeter, an error in wavelength setting of ±0.3 nm results in an error in dose measurement of 2%); (3) the light source and the reading wavelength must be set and the slit width adjusted for each type of dosimeter and hence, the spectrophotometer is not simple to use; and (4) the equipment is generally expensive. A photometer that is intended to eliminate these defects by using an optical filter to provide a narrow band of wavelengths is commercially available, but its power to resolve wavelengths is so low that precise measurement is not expected.

Therefore, one purpose of this invention is to provide a new apparatus for measuring absorbed dose that is free from the defects of the spectrophotometer and other conventional products. We made various studies to attain this purpose and the primary objective of the studies was to develop an accurate and simple means to obtain a light of a monochromatic light consistently. This objective is best attained by a light source that emits monochromatic light of reading wavelength without spectrophotometric system and hence the light source must have line spectrum but not continuous spectrum. To eliminate these problems, we came to think of the use of a hollow cathode lamp as the light source.

SUMMARY OF THE INVENTION

An object of this invention is to provide a novel dosimeter using a hollow cathode lamp as a light source.

Another object of this invention is to provide a novel dosimeter using a hollow cathode lamp of which cathodic material is manganese.

Further object of this invention is to provide a novel dosimeter using a hollow cathode lamp of which cathodic material is lithium.

Other objects of this invention will become apparent from the following description given with reference to the accompanying drawings.

DETAILED DESCRIPTION OF THE INVENTION

This invention relates to a novel dosimeter using a hollow cathode lamp as a light source.

A hollow cathode lamp consists of a bulb having a window with a quartz glass, UV transmissible quartz glass or borosilicate glass through which spectra rays are transmitted, a hollow cylindrical cathode, and an annular anode, and is filled with a neon gas at a few torrs. The cathode is made of the element or its alloy and is designed to provide sharp spectra rays entirely free from interfering spectra. When an electric discharge is established by applying voltage between the electrodes, electrons are generated on the inner surface of the cathode and flow to the anode through the cathode drop space and negative glow space and ionize inelastically the atoms of the gas with which the lamp is filled. The positive ions generated by the ionization are attracted by the electric field and impinge ions on the cathode surface. The kinetic energy of the impinging cause the atoms of the cathodic material to be sputtered from the cathode surface. The vapor is primarily composed of single atoms in a neutral ground state and its heat is diffused to the outside of the hollow tube. The electrons are accelerated toward the anode under the electric field. The accelerated electrons make an inelastic collision with the metal atoms being diffused in a ground state, and the excited atoms are returned to a ground state in a very short period (ca. $10^{-7}$ seconds), with the result that a monochromatic light having a wavelength equal to the difference in energy is emitted.

That is to say, a hollow cathode lamp provides a light having line spectrum depending upon the cathodic material and its construction permits increased luminous intensity.

Monochromatic light of the reading wavelength for a specific dosimeter can be obtained by filtrating extraneous light with interference filters. If manganese is used as the cathodic material, the light source has two strong monochromatic lights of 279.48 nm and 403.08 nm. The light having a wavelength of 279.48 nm is best suited for CTA dosimeter and another light can be used for cobalt glass dosimeter. If lithium is used as the cathodic material, a light having a wavelength of 670.78 nm is generated and it can be used for a blue Cellophane dosimeter.

Thus, by using a hollow cathode lamp adapted to the reading wavelength of a specific dosimeter, a light having a proper wavelength can always be produced efficiently without a spectrophotometric system using diffraction grating and/or a prism. Hollow cathode lamps generally have the following ratings: a tube voltage of 170 volts and a maximum current of about 20 milliamperes. The lamps require a small lightweight power supply. They usually measure about 39 mm in diameter (max.) and 165 mm long (max.) and hence require little storage space.

Figure 1:
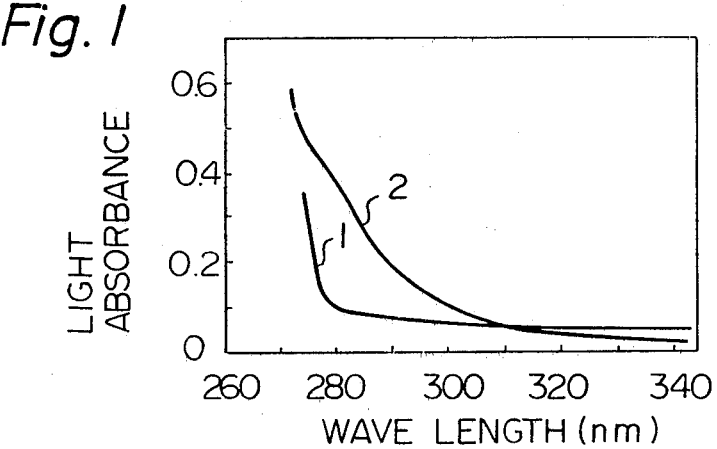
FIG. 1 is a chart of the absorption spectrum of an irradiated sample and the radiation induced absorption spectrum of an electron beam irradiated sample (5.5 Mrad) as obtained by a CTA film dosimeter at a wavelength of from 270 nm to 340 nm. In the figure, the reference numeral 1 indicates the spectrum of the unirradiated sample, and 2 indicates the radiation induced spectrum.
Figure 2:
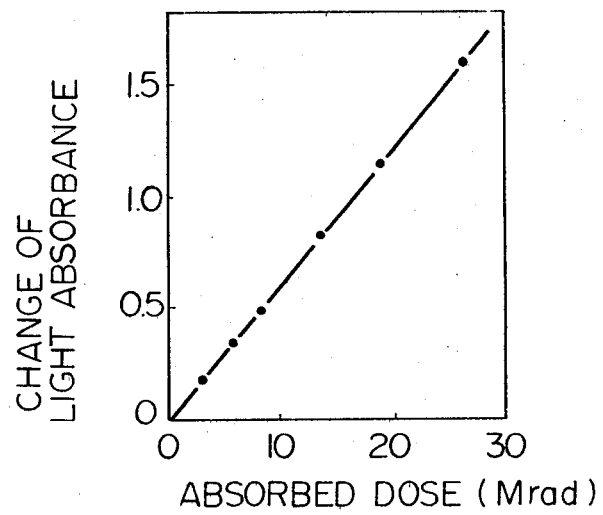
FIG. 2 is a graph showing the relation between the absorbed dose measured with a CTA film dosimeter and the change in light absorbance.
Figure 3:
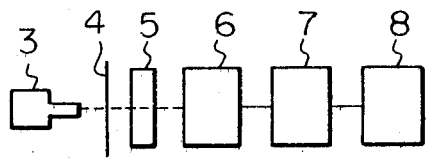
FIG. 3 is a block diagram of the apparatus of this invention. In the figure, the reference numeral 3 indicates a hollow cathode lamp, 4 is an optical filter, 5 is a sample chamber, 6 is a photomultiplier, 7 is an arithmetic unit, and 8 is an indication unit.

FIG. 3 is a block diagram of an apparatus for measuring radiation dose using a hollow cathode lamp. In the figure, the reference numeral 3 indicates the hollow cathode lamp which emits lights of different wavelengths. The unwanted light is removed with a filter indicated by 4 and the desired light enters a sample mounting chamber 5. The light transmitting the sample (film) is detected with a photomultiplier 6, converted to an electrical signal, subjected to an arithmetic operation in an arithmetic unit 7, and the resulting data of light absorbance is displayed by an indication unit 8.

The apparatus for measuring radiation dose using a hollow cathode lamp as a light source has the following advantages: (1) since it is lightweight and portable, it is handy to use in radiation engineering: (2) it is capable of providing a mono-chromatic light by selecting a proper hollow cathode lamp, so unlike the conventional spectrophotometer, it does not require the cumbersome resetting of reading wavelengths; (3) since it causes no error in wavelength setting, accurate measurement of radiation dose is possible; and (4) the equipment is simple in construction and is less expensive than the spectrophotometer. Having these features, the apparatus of this invention can be said to be an entirely new device for measuring radiation dose without experiencing the disadvantages of the spectrophotometer.

What is claimed is:

1. In an apparatus for measuring radiation dose using change in light absorbance of a transparent material upon irradiation which comprises a hollow cathode lamp light source, a monochromatic light emmiting unit, a unit for controlling the light amount, a sample mounting unit, a detection unit and an indication unit wherein said hollow cathode lamp light source includes a cathode of a material selected from the group consisting of manganese and lithium.

* * * * *